(12) United States Patent
Kang et al.

(10) Patent No.: US 11,694,844 B2
(45) Date of Patent: Jul. 4, 2023

(54) MULTILAYER ELECTRONIC COMPONENT

(71) Applicant: SAMSUNG ELECTRO-MECHANICS CO., LTD., Suwon-si (KR)

(72) Inventors: Byung Woo Kang, Suwon-si (KR); Bon Seok Koo, Suwon-si (KR); Jeong Ryeol Kim, Suwon-si (KR); Jung Min Kim, Suwon-si (KR); Jae Seok Yi, Suwon-si (KR); Ji Hye Han, Suwon-si (KR); Hye Jin Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/308,273

(22) Filed: May 5, 2021

(65) Prior Publication Data
US 2022/0139618 A1    May 5, 2022

(30) Foreign Application Priority Data

Nov. 3, 2020   (KR) ........................ 10-2020-0145462

(51) Int. Cl.
*H01G 4/248*    (2006.01)
*H01G 4/30*     (2006.01)
*H01G 4/015*    (2006.01)

(52) U.S. Cl.
CPC ............. *H01G 4/015* (2013.01); *H01G 4/248* (2013.01); *H01G 4/30* (2013.01)

(58) Field of Classification Search
CPC .......... H01G 4/015; H01G 4/248; H01G 4/30
See application file for complete search history.

(56) References Cited

U.S. PATENT DOCUMENTS

| | | | |
|---|---|---|---|
| 10,354,802 B1* | 7/2019 | Bae | H01G 2/065 |
| 10,453,612 B2* | 10/2019 | Terashita | H01G 4/248 |
| 2008/0073108 A1* | 3/2008 | Saito | H01G 4/2325 |
| | | | 174/256 |
| 2010/0067170 A1* | 3/2010 | Koga | H01G 4/232 |
| | | | 29/25.42 |

(Continued)

FOREIGN PATENT DOCUMENTS

| | | | | |
|---|---|---|---|---|
| CN | 109935467 A | * | 6/2019 | ............. H01G 4/224 |
| CN | 111739732 A | * | 10/2020 | ............. H01G 4/005 |

(Continued)

*Primary Examiner* — Dion R. Ferguson
(74) *Attorney, Agent, or Firm* — Morgan, Lewis & Bockius LLP (57) ABSTRACT

A multilayer electronic component includes a body including first and second surfaces opposing each other in a first direction, third and fourth surfaces connected to the first and second surfaces and opposing each other in a second direction, and fifth and sixth surfaces connected to the first to fourth surfaces and opposing each other in a third direction and including a dielectric layer and internal electrodes alternately disposed with the dielectric layer interposed therebetween in the first direction, and external electrodes disposed on the third and fourth surfaces, wherein the external electrodes include an electrode layer disposed on the body and a conductive resin layer disposed on the electrode layer, and the conductive resin layer includes a conductive metal, an epoxy resin, and an acrylic resin.

25 Claims, 8 Drawing Sheets

(56) References Cited

U.S. PATENT DOCUMENTS

| | | | |
|---|---|---|---|
| 2013/0170095 A1 | 7/2013 | Oh et al. | |
| 2015/0090483 A1* | 4/2015 | Moon | H01G 4/232 29/25.42 |
| 2017/0098506 A1* | 4/2017 | Ando | H01G 4/228 |
| 2017/0154729 A1 | 6/2017 | Lee et al. | |
| 2018/0114644 A1* | 4/2018 | Sugita | H01G 4/12 |
| 2019/0189348 A1* | 6/2019 | Choi | H01G 4/232 |
| 2019/0237259 A1* | 8/2019 | Onodera | H01G 4/005 |
| 2019/0362895 A1* | 11/2019 | Kobayashi | H01G 4/30 |
| 2020/0075247 A1* | 3/2020 | Kim | H01G 4/30 |
| 2020/0168396 A1* | 5/2020 | Nakamoto | H01G 4/232 |
| 2020/0185153 A1* | 6/2020 | Yun | H01G 4/012 |
| 2020/0312551 A1* | 10/2020 | Nagai | H01G 4/005 |
| 2020/0312571 A1* | 10/2020 | Yatagawa | H01G 4/012 |
| 2022/0139618 A1* | 5/2022 | Kang | H01G 4/015 361/273 |

FOREIGN PATENT DOCUMENTS

| | | | |
|---|---|---|---|
| JP | 2010073780 A * | 4/2010 | H01G 4/228 |
| JP | 2020096148 A * | 6/2020 | H01G 4/008 |
| KR | 10-1245347 B1 | 3/2013 | |
| KR | 10-2015-0080739 A | 7/2015 | |
| KR | 20150080739 A * | 7/2015 | |
| KR | 10-2017-0061372 A | 6/2017 | |
| KR | 20200071316 A * | 6/2020 | |
| KR | 102270303 B1 * | 6/2021 | |
| WO | WO-2020121599 A1 * | 6/2020 | |

\* cited by examiner

MULTILAYER ELECTRONIC COMPONENT

CROSS-REFERENCE TO RELATED APPLICATION(S)

This application claims benefit of priority to Korean Patent Application No. 10-2020-0145462 filed on Nov. 3, 2020 in the Korean Intellectual Property Office, the disclosure of which is incorporated herein by reference in its entirety.

BACKGROUND

1. Field

The present disclosure relates to a multilayer electronic component.

2. Description of Related Art

A multilayer ceramic capacitor (MLCC), a multilayer electronic component, is a chip-type condenser mounted on printed circuit boards of various types of electronic products such as display devices including liquid crystal displays (LCDs) and plasma display panels (PDPs), computers, smartphones, cell phones, and the like to allow electricity to be charged therein and discharged therefrom.

Such an MLCC having advantages such as compactness, guaranteed high capacitance, and ease in mounting thereof may be used as a component of various electronic devices. As various electronic devices such as computers, mobile devices, and the like, have become smaller and higher in terms of power output, demand for miniaturization and higher capacity of multilayer ceramic capacitors has increased.

In addition, as industry interest in electric parts for automobiles has recently increased, MLCCs are also required to have high reliability and high strength characteristics in order to be used in automobile or infotainment systems.

In order to ensure high reliability and high strength characteristics, a method of modifying external electrodes formed of electrode layers to have a dual-layer structure including an electrode layer and a conductive resin layer has been proposed.

The dual-layer structure of the electrode layer and the conductive resin layer may absorb external impacts by applying a resin composition containing a conductive material to the electrode layer and improve reliability by preventing penetration of a plating solution.

However, as the standards for high reliability and high strength characteristics required in the industry are gradually being increased, a method for further improving high reliability and high strength characteristics in line therewith is required.

SUMMARY

Exemplary embodiments provide a multilayer electronic component having improved flexural strength characteristics generated in the multilayer electronic component.

Exemplary embodiments provide a multilayer electronic component having a low equivalent series resistance (ESR).

However, the aspect of the present disclosure is not limited to the aforementioned contents and may be more easily understood in the process of describing a specific exemplary embodiment in the present disclosure.

According to an exemplary embodiment, a multilayer electronic component includes: a body including first and second surfaces opposing each other in a first direction, third and fourth surfaces connected to the first and second surfaces and opposing each other in a second direction, and fifth and sixth surfaces connected to the first to fourth surfaces and opposing each other in a third direction and including a dielectric layer and internal electrodes alternately disposed with the dielectric layer interposed therebetween in the first direction; and external electrodes disposed on the third and fourth surfaces, wherein the external electrodes include an electrode layer disposed on the body and a conductive resin layer disposed on the electrode layer, and the conductive resin layer includes a conductive metal, an epoxy resin, and an acrylic resin.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least an example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, and may include changes in shape occurring during manufacturing.

The features of the examples described herein may be combined in various manners, as will be apparent after gaining an understanding of the disclosure of this application. Further, although the examples described herein have a variety of configurations, other configurations are possible, as will be apparent after an understanding of the disclosure of this application.

The drawings may not be to scale, and the relative size, proportions, and depiction of elements in the drawings may be exaggerated for clarity, illustration, and convenience. In the drawing, X direction may be defined as a second direction or a length direction of a body, Y direction may be defined as a third direction or a width direction of the body, and Z direction may be defined as a first direction or a thickness direction or a lamination direction of the body.

Multilayer Electronic Component

Figure 1:
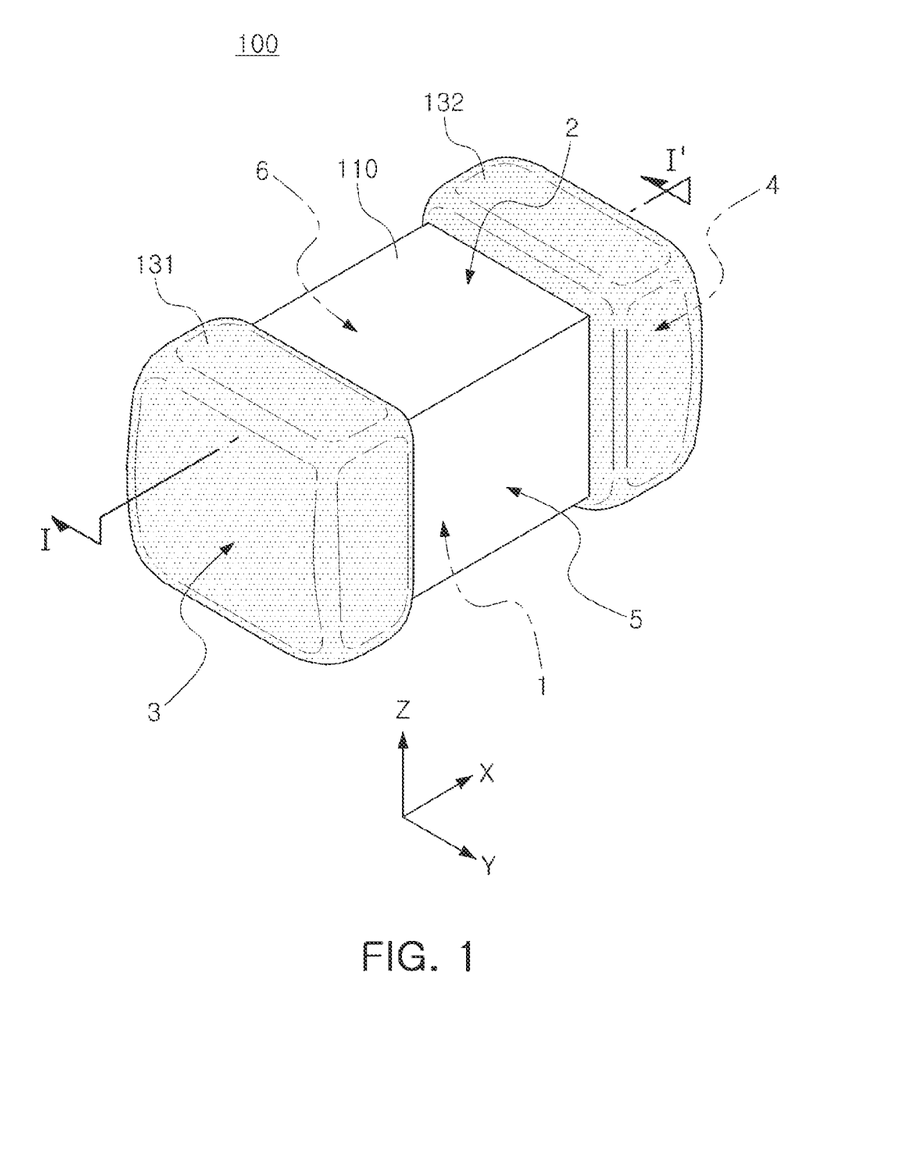
FIG. 1 is a schematic perspective view of a multilayer electronic component according to an exemplary embodiment in the present disclosure.

FIG. 1 is a schematic perspective view of a multilayer electronic component according to an exemplary embodiment in the present disclosure.

Figure 2:
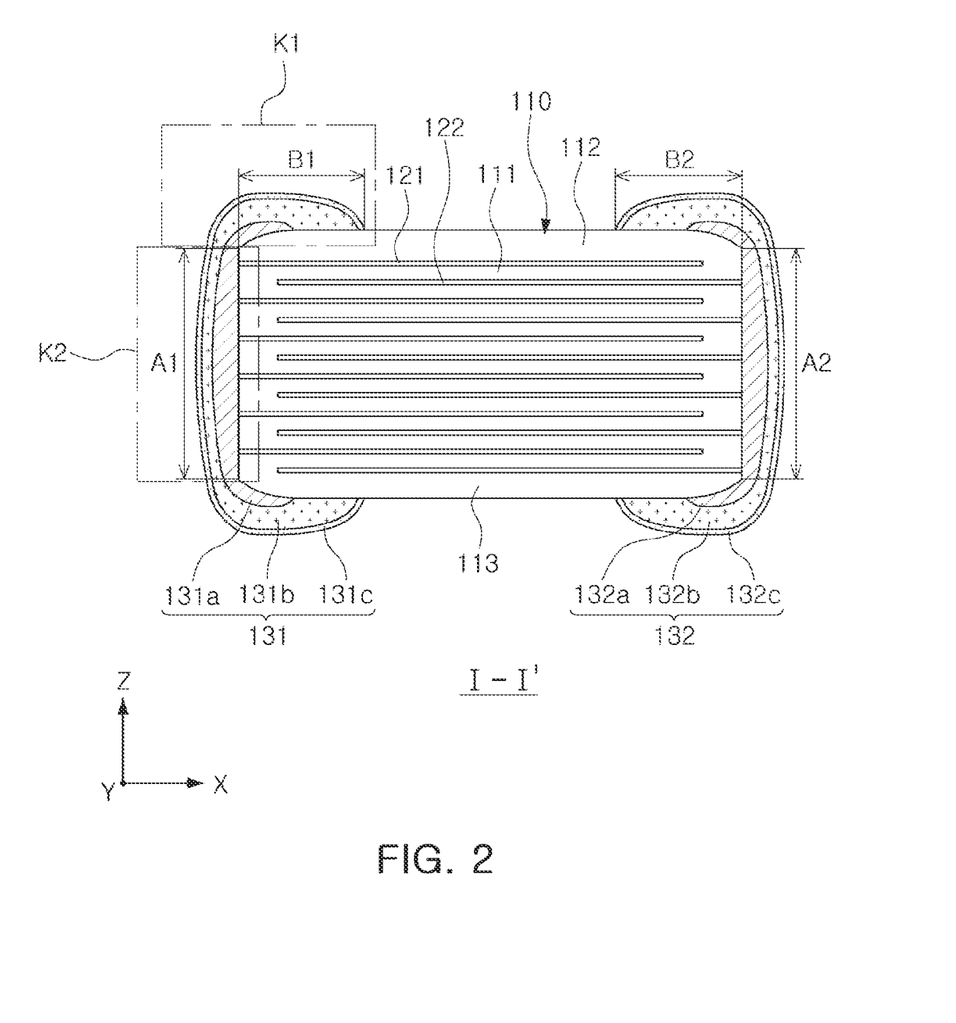
FIG. 2 is a cross-sectional view taken along line I-I' of FIG. 1.

FIG. 2 is a cross-sectional view taken along line I-I' of FIG. 1.

Figure 3:
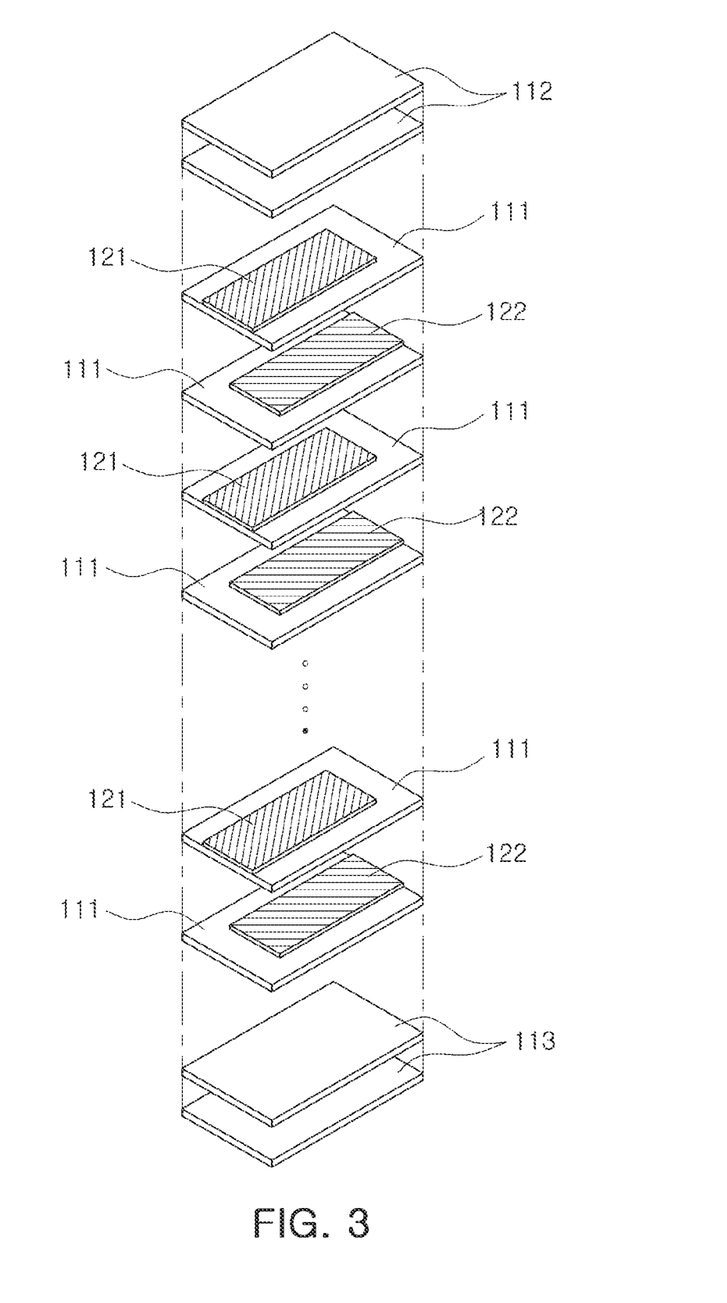
FIG. 3 is an exploded perspective view schematically illustrating a body in which a dielectric layer and an internal electrode are laminated according to an exemplary embodiment in the present disclosure.

FIG. 3 is an exploded perspective view schematically illustrating a body in which a dielectric layer and an internal electrode are laminated according to an exemplary embodiment in the present disclosure.

Figure 4:
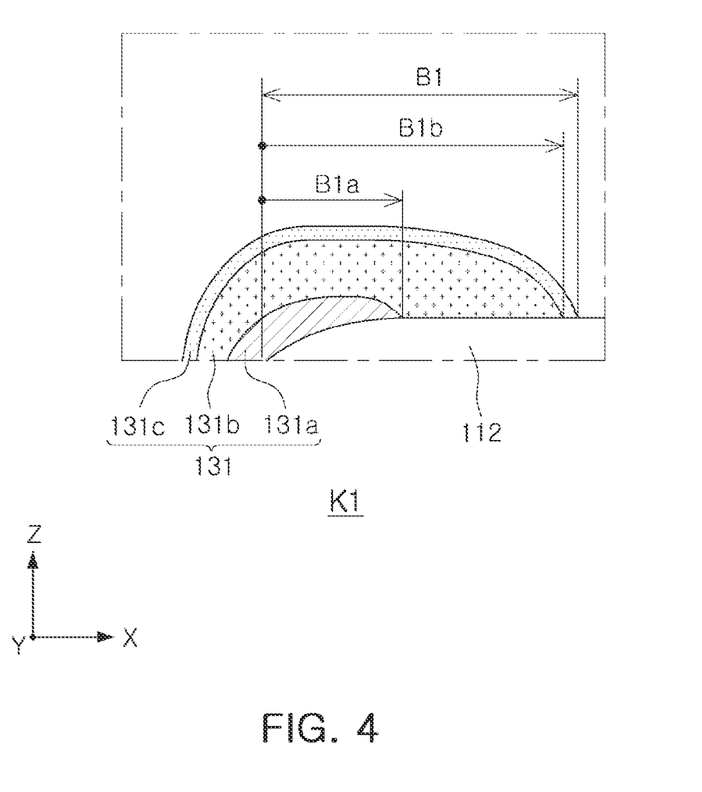
FIG. 4 is an enlarged view of region K1 of FIG. 2.

FIG. 4 is an enlarged view of region K1 of FIG. 2.

Figure 5:
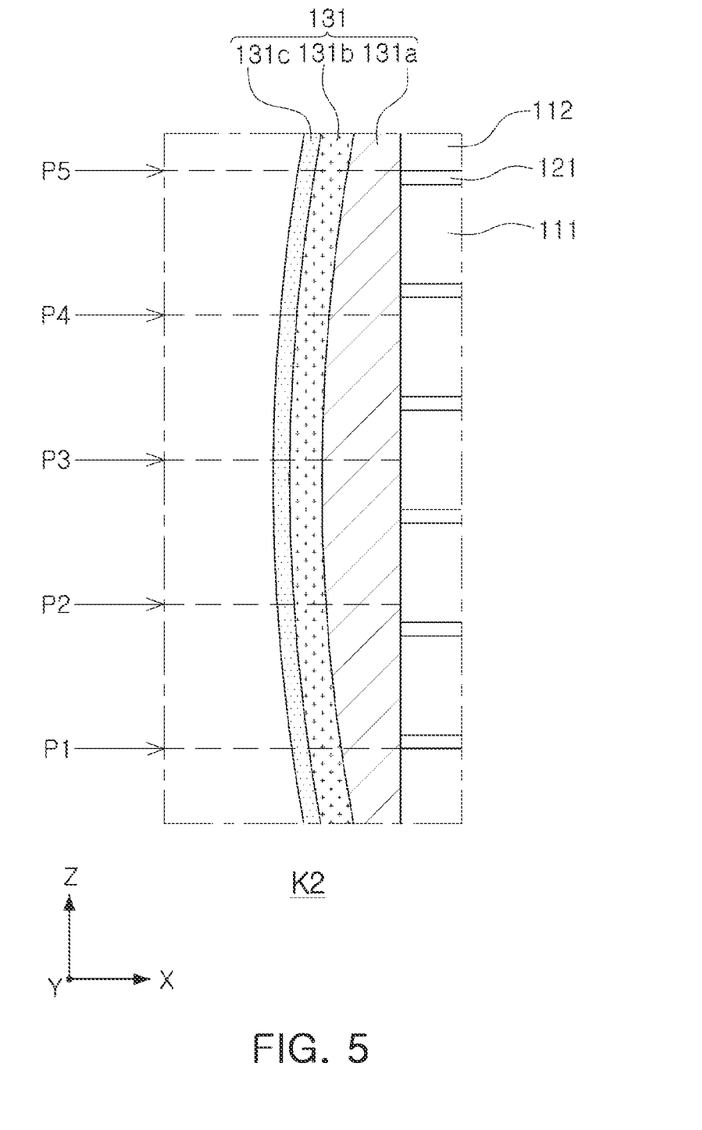
FIG. 5 is an enlarged view of region K2 of FIG. 2.

FIG. 5 is an enlarged view of region K2 of FIG. 2.

Hereinafter, a multilayer electronic component 100 according to an exemplary embodiment in the present disclosure will be described with reference to FIGS. 1 through 5.

The multilayer electronic component 100 according to an exemplary embodiment in the present disclosure includes a body 110 including first and second surfaces 1 and 2 opposing each other in the first direction (Z direction), third and fourth surfaces 3 and 4 connected to the first and second surfaces 1 and 2 and opposing each other in the second direction (X direction), and fifth and sixth surfaces 5 and 6 connected to the first to fourth surfaces and opposing each other in the third direction (Y direction) and including a dielectric layer 111 and internal electrodes 121 and 122 alternately disposed with the dielectric layer interposed therebetween in the first direction; and external electrodes 131 and 132 disposed on the third and fourth surfaces, wherein the external electrodes 131 and 132 include electrode layers 131a and 132a disposed on the body and conductive resin layers 131b and 132b disposed on the electrode layers 131a and 132a, and the conductive resin layers include a conductive metal, an epoxy resin, and an acrylic resin.

In the body 110, the dielectric layer 111 and the internal electrodes 121 and 122 are alternately laminated.

The body 110 may be formed in a hexahedral shape or a similar shape, but there is no limitation on a specific shape.

A specific shape of the body 110 is not limited, but, as illustrated, the body 110 may have a hexahedral shape or a similar shape. Due to shrinkage of ceramic powder particle contained in the body 110 during firing, the body 110 may not have a hexahedral shape with perfect straight lines but a substantially hexahedral shape.

The body 110 may have the first and second surfaces 1 and 2 opposing each other in the first direction (Z direction), the third and fourth surfaces 3 and 4 connected to the first and second surfaces 1 and 2 and opposing each other in the second direction (X direction), and the fifth and sixth surfaces 5 an 6 connected to the first and second surfaces 1 and 2, connected to the third and fourth surfaces 3 and 4, and opposing each other in the third direction (Y direction).

A plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a material for forming the dielectric layer 111 is not limited as long as sufficient electrostatic capacity may be obtained. For example, a barium titanate-based material, a lead composite perovskite-based material, or a strontium titanate-based material may be used. The barium titanate-based material may include a $BaTiO_3$-based ceramic powder particle, and the ceramic powder particle may include $BaTiO_3$ and $(Ba_{1-x}Ca_x)\ TiO_3$ $(0<x<1)$, $Ba(Ti_{1-y}Ca_y)\ O_3$ $(0<y<1)$, $(Ba_{1-x}Ca_x)\ (Ti_{1-y}Zr_y)\ O_3$ $(0<x<1$ and $0<y<1)$, or $Ba(Ti_{1-y}Zr_y)O_3$ $(0<y<1)$ obtained by partially dissolving calcium (Ca), zirconium (Zr), and the like in $BaTiO_3$.

As a material for forming the dielectric layer 111, various ceramic additives, organic solvents, binders, dispersants, etc. may be added to the powder particle such as barium titanate ($BaTiO_3$) or the like according to purposes of the present disclosure.

The body 110 may include a capacitance forming portion formed inside the body 110 and forming capacitance with the first internal electrode 121 and the second internal electrode 122 disposed to face each other with the dielectric layer 111 interposed therebetween and protective layers 112 and 113 formed above and below the capacitance forming portion.

The capacitance forming portion is a part that contributes to formation of capacitance of the capacitor, which may be formed by repeatedly laminating a plurality of first and second internal electrodes 121 and 122 with the dielectric layer 111 interposed therebetween.

The upper protective layer 112 and the lower protective layer 113 may be formed by laminating a single dielectric layer or two or more dielectric layers on upper and lower surfaces of the capacitance forming portion in an up-down direction, respectively, and may basically serve to prevent damage to the internal electrodes due to physical or chemical stress.

The upper protective layer 112 and the lower protective layer 113 may not include an internal electrode and may include the same material as that of the dielectric layer 111.

The internal electrodes 121 and 122 may be disposed to face each other with the dielectric layer 111 interposed therebetween.

The internal electrodes may include first and second internal electrodes 121 and 122 alternately disposed to face each other with the dielectric layer interposed therebetween.

The first and second internal electrodes 121 and 122 may be exposed to the third and fourth surfaces 3 and 4 of the body 110, respectively.

Referring to FIG. 2, the first internal electrode 121 may be spaced apart from the fourth surface 4 and exposed to the third surface 3, and the second internal electrode 122 may be spaced apart from the third surface 3 and exposed to the fourth surface 4. The first external electrode 131 may be disposed on the third surface 3 of the body and connected to the first internal electrode 121, and the second external electrode 132 may be disposed on the fourth surface 4 of the body and connected to the second internal electrode 122.

In other words, the first internal electrode 121 may not be connected to the second external electrode 132 and may be connected to the first external electrode 131, and the second internal electrode 122 may not be connected to the first external electrode 131 and may be connected to the second external electrode 132. Accordingly, the first internal electrode 121 is formed to be spaced apart from the fourth surface 4 by a predetermined distance, and the second internal electrode 122 is formed to be spaced apart from the third surface 3 by a predetermined distance.

The first and second internal electrodes 121 and 122 may be electrically separated from each other by the dielectric layer 111 disposed therebetween.

Referring to FIG. 3, the body 110 may be formed by laminating the dielectric layer 111 on which the first internal electrode 121 is printed and the dielectric layer 111 on which the second internal electrode 122 is printed in the thickness direction (Z direction) and subsequently firing the laminate.

A material forming the internal electrodes 121 and 122 is not limited, and a material having excellent electrical conductivity may be used. For example, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti), or alloys thereof on a ceramic green sheet.

As a printing method of the conductive paste for internal electrodes, a screen printing method or a gravure printing method may be used and the present disclosure is not limited thereto.

The first and second external electrodes 131 and 132 are disposed on the body 110 and include electrode layers 131a and 132a and conductive resin layers 131b and 132b, respectively.

The external electrodes may include first and second external electrodes 131 and 132 connected to the first and second internal electrodes 121 and 122, respectively.

The first external electrode 131 may include a first electrode layer 131a and a first conductive resin layer 131b, and the second external electrode 132 may include a second electrode layer 132a and a second conductive resin layer 132b.

The first and second electrode layers 131 and 132 may be formed of any material as long as the material has electrical conductivity, such as a metal, and a specific material may be determined in consideration of electrical characteristics and structural stability.

For example, the first and second electrode layers 131 and 132 may include a conductive metal and glass.

A conductive metal used in the electrode layers 131a and 132a is not limited as long as it is a material that can be electrically connected to the internal electrode for forming capacitance. For example, the conductive metal may include at least one selected from the group consisting of nickel (Ni), copper (Cu), palladium (Pd), silver (Ag), gold (Au), platinum (Pt), tin (Sn), tungsten (W), titanium (Ti), and alloys thereof.

The electrode layers 131a and 132a may be formed by applying a conductive paste prepared by adding a glass frit to the conductive metal powder particle and subsequently firing the conductive paste.

In addition, the first and second electrode layers 131a and 132a may also be formed using an atomic layer deposition (ALD), a molecular layer deposition (MLD) method, a chemical vapor deposition (CVD) method, a sputtering method, or the like.

In addition, the first and second electrode layers 131a and 132a may be formed by transferring a sheet including a conductive metal to the body 110.

The conductive resin layers 131b and 132b may include a conductive metal, and an epoxy resin. Also, the conductive resin layers 131b and 132b include a conductive metal, an epoxy resin, and an acrylic resin.

The conductive metal included in the conductive resin layers 131b and 132b serves to electrically connect the conductive resin layers 131b and 132b to the electrode layers 131a and 132a, respectively.

The conductive metal included in the conductive resin layers 131b and 132b is not particularly limited as long as it is a material that can be electrically connected to the electrode layers 131a and 132a, and may include at least one selected from the group consisting of, for example, nickel (Ni), copper (Cu), palladium (Pd), silver (Ag), gold (Au), platinum (Pt), tin (Sn), tungsten (W), titanium (Ti), and alloys thereof.

The conductive metal included in the conductive resin layers 131b and 132b may include at least one of a spherical powder particle or a flake powder particle. That is, the conductive metal may be formed of only the flake particle or only the spherical particle or may be formed of a mixture of the flake particle and the spherical particle.

Here, the spherical particle may include a form that is not completely spherical, for example, a form in which a length ratio of a major axis and a minor axis (major axis/minor axis) is 1.45 or less.

The flake particle refers to a particle having a flat and elongated shape, in which a length ratio of a major axis and a minor axis (major axis/minor axis) may be 1.95 or more, but is not limited thereto.

The lengths of the major axis and the minor axis of the spherical powder particle and the flake particle may be measured from an image obtained by scanning an X and Z-directional cross-section (L-T cross-section) taken at a central portion of a multilayer electronic component in the width direction Y with the SEM.

The epoxy resin and acrylic resin included in the conductive resin layers 131b and 132b serve to ensure bondability and absorb impacts.

In general, in the related art, an epoxy resin was used as a resin included in the conductive resin layer. However, there is a limit to increasing ductility with only the epoxy resin.

Thus, according to an exemplary embodiment in the present disclosure, ductility of the conductive resin layers 131b and 132b is maximized by adding both the epoxy resin and the acrylic resin to the conductive resin layers 131b and 132b, thereby improving flexural strength characteristics. When both the epoxy resin and the acrylic resin are added, superior mechanical properties as compared with a case in which the epoxy resin or acrylic resin is added alone may be secured, thereby improving the flexural strength characteristics.

The epoxy resin and the acrylic resin included in the conductive resin layers 131b and 132b may be determined through secondary ion mass spectrometry (SIMS) analysis. Here, the SIMS analysis refers to an analysis method of causing primary ions ($Bi^{nm+}$, $O^{2+}$, $Cs^+$, $Ar^{n+}$) with appropriate keV energy to collide with a surface of a material and analyzing a mass of ionized particles emitted from the surface of the sample to thereby obtain information on atoms present on the surface and a structural arrangement thereof.

Figure 6:
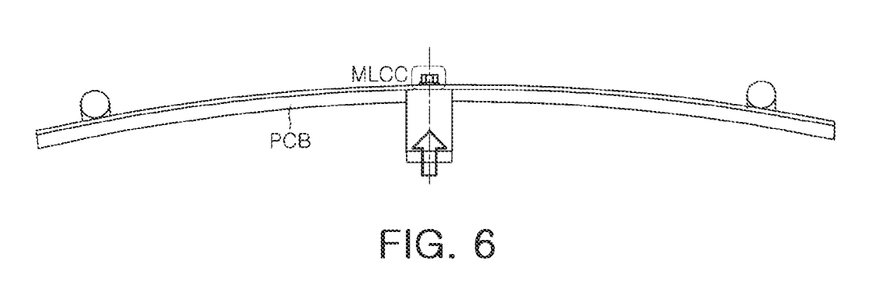
FIG. 6 is a view illustrating a bending test method.

FIG. 6 is a view illustrating a bending test method.

Figure 7:
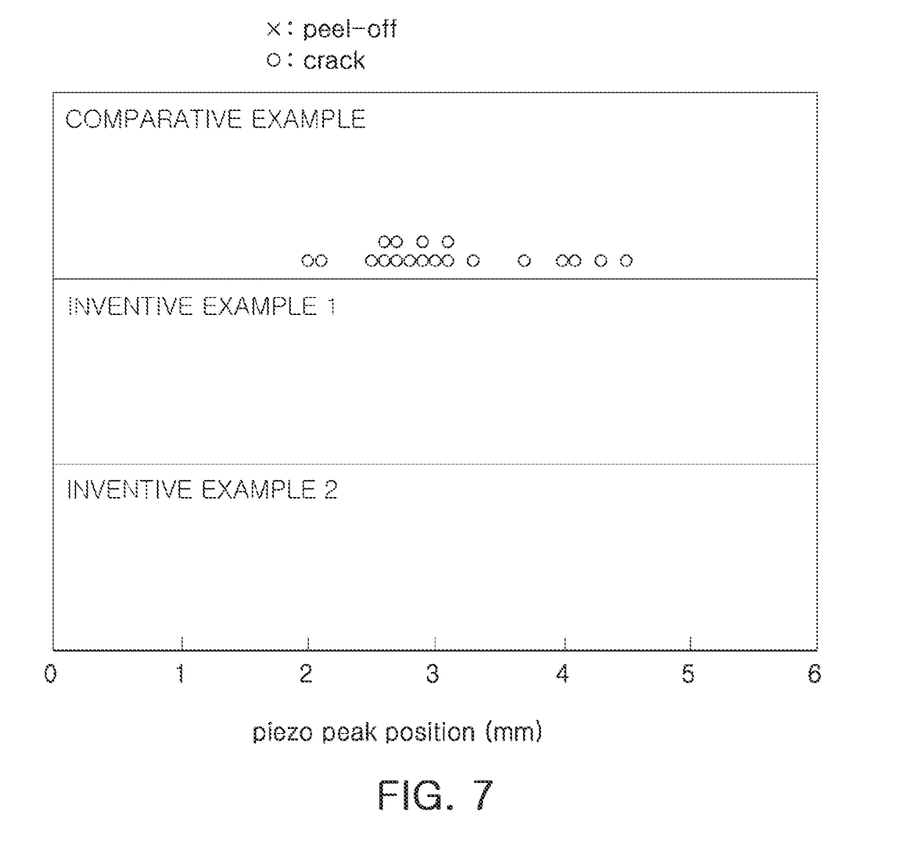
FIG. 7 is a graph evaluating flexural strength of a multilayer electronic component according to whether a conductive resin layer of the present disclosure is applied, showing a bending test result according to the test method of FIG. 5.

FIG. 7 is a graph evaluating flexural strength of a multilayer electronic component in which a conductive resin layer of the present disclosure is applied, showing a bending test result according to the test method of FIG. 5.

Figure 8:
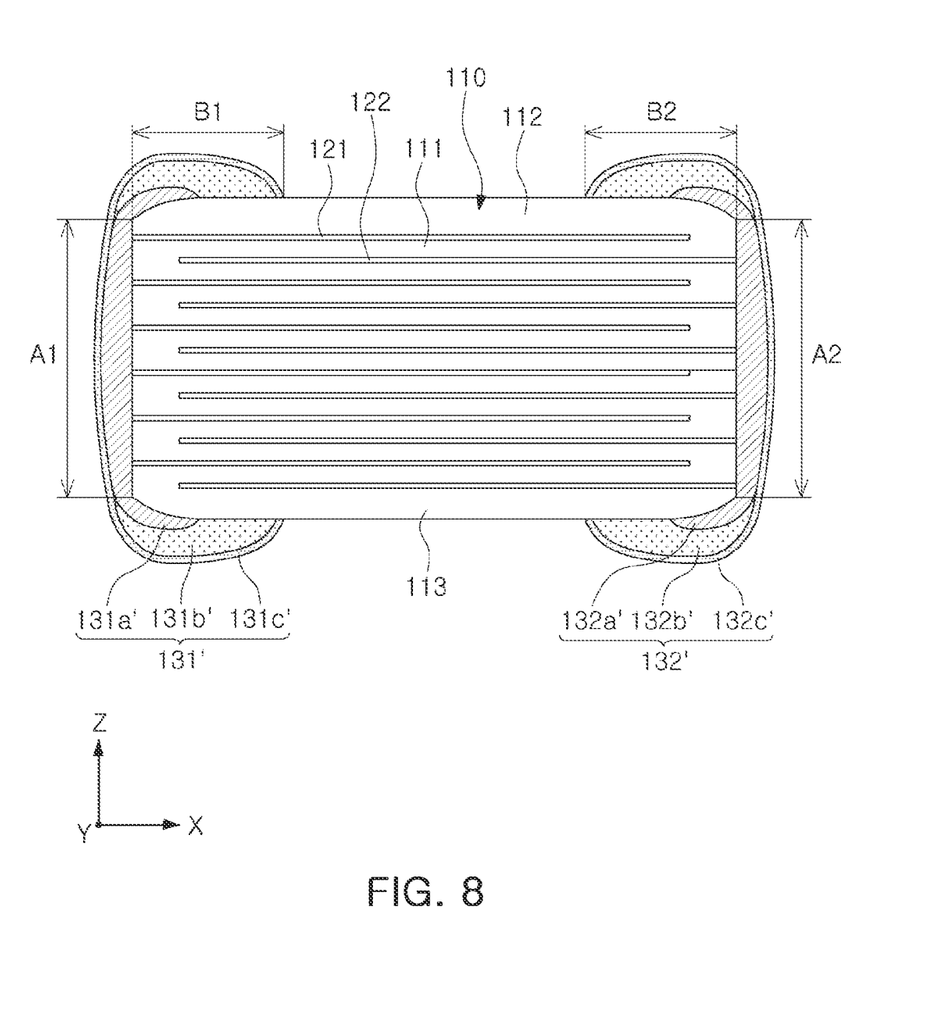
FIG. 8 is a cross-sectional view of a multilayer electronic component according to another exemplary embodiment in the present disclosure corresponding to FIG. 2.

In FIG. 7, a conductive resin layer of Comparative Example includes a conductive metal and an epoxy resin but does not include an acrylic resin, and the conductive resin layers of Inventive Examples 1 and 2 include a conductive metal, an epoxy resin, and an acrylic resin. In addition, Comparative Example and Inventive Example 1 have an external electrode structure in which a conductive resin layer is disposed even at a connection portion as shown in FIG. 2, and Inventive Example 2 has an external electrode structure in which a conductive resin layer is not disposed in a partial region of a connection portion as shown in FIG. 8. Thirty samples were prepared for each of Comparative Example, Inventive Example 1, and Inventive Example 2.

Referring to FIG. 6, a sample chip (MLCC) was mounted on a printed circuit board (PCB), and a side opposite to a side on which the sample chip (MLCC) was mounted was pressed by up to 6 mm, during which a point where the external electrode was separated from the body to end up with peel-off or a point where the body was cracked to end up with cracking was indicated as piezo peak position in FIG. 6.

In Comparative Example, the body was cracked in 19 out of 30 samples. Meanwhile, in the case of Inventive Examples 1 and 2, none of the 30 samples had peel-off or cracking. Therefore, it was confirmed that flexural strength may be guaranteed in the 6 mm flexural strength test when the conductive resin layer includes both the epoxy resin and the acrylic resin.

Here, a ratio of the epoxy resin and the acrylic resin of the conductive resin layer does not need to be particularly limited and may be appropriately determined in consideration of a length, a thickness, and the like, of a band portion of the conductive resin layer and in consideration of tensile strength, elongation, Young's modulus, and the like based on the ratio of the epoxy resin and the acrylic resin. For example, when the sum of weight of the epoxy resin and the acrylic resin of the conductive resin layer is 100, a weight ratio of the epoxy resin to the acrylic resin may be 25 to 75%: 75 to 25%. That is, when the sum of the epoxy resin and the acrylic resin in the conductive resin layer is 100 wt %, the epoxy resin may be 25 wt % to 75 wt % and the remainder may be the acrylic resin.

In addition, in the conductive resin layer, the weight content of the sum of the epoxy resin and the acrylic resin relative to the conductive metal need not be particularly limited. That is, the content may be appropriately determined in consideration of an electrical characteristic and flexural strength characteristics. For example, the weight content of the sum of the epoxy resin and the acrylic resin relative to the conductive metal may be 2% or more and 25% or less.

Meanwhile, the epoxy resin and the acrylic resin included in the conductive resin layer may not need to be limited in type.

For example, the epoxy resin may include bisphenol-A (BPA)-based epoxy, novolac-based epoxy, and the like, and the acrylic resin may include an acrylate-based resin, a methacrylate-based resin, and the like.

The external electrodes 131 and 132 may include connection portions A1 and A2 disposed on the third and fourth surfaces of the body 110, respectively, and band portions B1 and B2 extending from the connection portions to the first and second surfaces, respectively.

Referring to FIG. 2, when regions of the first external electrode 131 are divided according to positions, the first external electrode 131 may include a first connection portion A1 disposed on the third surface 3 of the body and a first band portion B1 extending from the first connection portion A1 to parts of the first, second, fifth, and sixth surfaces 1, 2, 5, and 6 of the body.

When regions of the second external electrode 132 are divided according to positions, the second external electrode 132 may include a second connection portion A2 disposed on the fourth surface 4 of the body and a second band portion B2 extending from the second connection portion A2 to parts of the first, second, fifth, and sixth surfaces 1, 2, 5, and 6 of the body.

Referring to FIG. 2, as only one of the first and second internal electrodes 121 and 122 is disposed at the end of the body 110 in the length direction (X direction), a step may occur. Accordingly, the edge of the body 110 in the length direction (X direction) may have a thickness smaller than that of a central portion of the body 110 in the length direction (X direction), and the first and second surfaces 1 and 2 may be shrunken to the central portion of the body 110 in the thickness direction (Z direction) at the end of the body 110 in the length direction (X direction).

According to an exemplary embodiment in the present disclosure, an average thickness of the conductive resin layers 131b and 132b at the connection portions A1 and A2, respectively, may be smaller than an average thickness thereof at the band portions B1 and B2, respectively. A thickness of the conductive resin layers at the connection portions is a thickness that is perpendicular the surface 3 or 4 of the body. A thickness of the conductive resin layers at the connection portions is a thickness that is perpendicular the surface 1, 2, 5 or 6 of the body. Referring to FIG. 2, the average thickness of the band portions in Table 1 is a value obtained by averaging maximum values of the conductive resin layers 131b and 132b at four band portions of the external electrodes disposed on the first surface and the second surface of the body in the cross-section (L-T cross-section) taken in the length direction (X direction) and thickness direction (Z direction) at the center of the body in the width direction (Y-direction).

In the case of adding both the epoxy resin and the acrylic resin to the conductive resin layers 131b and 132b to maximize ductility of the conductive resin layers 131b and 132b, an equivalent series resistance (ESR) characteristic may increase.

According to an exemplary embodiment in the present disclosure, the average thickness of the conductive resin layers 131b and 132b is large at the band portions B1 and B2 that significantly affect the flexural strength characteristics, and the average thickness of the conductive resin layers 131b and 132b is small at the connection portions A1 and A2 that significantly affect ESR, thereby lowering the ESR, while ensuring the flexural strength characteristics.

A manufacturing method for implementing a structure in which the average thickness of the conductive resin layers 131b and 132b at the connection portions A1 and A2 is small is not particularly limited.

For example, a method of forming the electrode layers 131a and 132a on the body 110, applying a paste for a conductive resin layer to the electrode layers 131a and 132a, removing the paste for a conductive resin layer applied to the connection portion using a porous nonwoven fabric, and performing a curing process to form the conductive resin layers 131b and 132b may be used.

Here, the average thickness of the conductive resin layers 131b and 132b in the connection portions A1 and A2 may be less than 13 µm.

If the average thickness of the conductive resin layers 131b and 132b at the connection portions A1 and A2 is 13 µm or more, the ESR may increase to deteriorate electrical characteristics. Therefore, the average thickness of the conductive resin layers 131b and 132b at the connection portions A1 and A2 is preferably less than 13 µm, and, more preferably, 7.4 µm or less.

Table 1 below shows evaluation of the ESR and flexural strength characteristics according to the average thicknesses of the conductive resin layers 131b and 132b at the connection portions A1 and A2 and the band portions B1 and B2.

Referring to FIG. 5, the thicknesses of the conductive resin layer 131b at respective positions of the connection portion of Table 1 were measured from five points P1, P2, P3, P4, and P5 at equal intervals from the lowermost internal electrode 121 to the uppermost internal electrode 121 in a cross-section (L-T cross-section) taken in the length direction (X direction) and thickness direction (Z direction) at the center of the body in the width direction (Y-direction), and the average thickness of the connection portion in Table 1 is an average value of the thicknesses of the conductive resin layer 131b at the 5 points P1, P2, P3, P4, and P5.

Referring to FIG. 2, the average thickness of the band portions in Table 1 is a value obtained by averaging maximum values of the conductive resin layers 131b and 132b at four band portions of the external electrodes disposed on the first surface and the second surface of the body in the cross-section (L-T cross-section) taken in the length direction (X direction) and thickness direction (Z direction) at the center of the body in the width direction (Y-direction).

Referring to FIG. 6, thirty sample chips per test No. were prepared and each sample chip (MLCC) was mounted on a PCB. It was determined whether peel-off occurred as the external electrode is separated from the body or whether cracking occurred as the body cracked, while pressing the opposite surface of the surface on which the sample chip (MLCC) is mounted. A case in which the number of samples in which peel-off or cracking occurred was five or less is marked as "O," while a case in which the number of samples in which peel-off or cracking occurred exceeded five is marked as "X."

Each measurement value of ESR is shown in Table 1 below, in which ESR of 200 mΩ or less is marked as O and ESR exceeding 200 mΩ is marked as X.

TABLE 1

| Test No. | Thickness of connection portion at each position (µm) | | | | | Average thickness of connection portion (µm) | Average thickness of band portion (µm) | ESR (mΩ) | | Flexural strength |
|---|---|---|---|---|---|---|---|---|---|---|
| | P1 | P2 | P3 | P4 | P5 | | | | | |
| 1 | 13.9 | 45.6 | 61.9 | 38.3 | 9.9 | 33.9 | 24.25 | 139548 | X | O |
| 2 | 13.9 | 45.6 | 61.9 | 38.3 | 9.9 | 33.9 | 17.45 | 139548 | X | O |
| 3 | 13.9 | 45.6 | 61.9 | 38.3 | 9.9 | 33.9 | 9.11 | 139548 | X | X |
| 4 | 12.1 | 30.3 | 49.8 | 29.4 | 11.5 | 26.6 | 24.25 | 133406 | X | O |
| 5 | 9.5 | 16.1 | 26.6 | 16.9 | 8.9 | 15.6 | 20.04 | 31385 | X | O |
| 6 | 9.5 | 16.1 | 26.6 | 16.9 | 8.9 | 15.6 | 9.15 | 31385 | X | X |
| 7 | 8.3 | 15.4 | 24.1 | 11.4 | 5.8 | 13.0 | 17.99 | 319 | X | O |

TABLE 1-continued

| Test No. | Thickness of connection portion at each position (μm) | | | | | Average thickness of connection portion (μm) | Average thickness of band portion (μm) | ESR (mΩ) | Flexural strength |
|---|---|---|---|---|---|---|---|---|---|
| | P1 | P2 | P3 | P4 | P5 | | | | |
| 8 | 8.3 | 15.4 | 24.1 | 11.4 | 5.8 | 13.0 | 9.43 | 319 | X X |
| 9 | 4.1 | 7.7 | 11.9 | 8.2 | 4.9 | 7.4 | 16.85 | 20.1 | ○ ○ |
| 10 | 3.4 | 6.1 | 8.9 | 6.4 | 3.1 | 5.6 | 20.04 | 18.7 | ○ ○ |
| 11 | 2.2 | 3.5 | 5.5 | 3.6 | 2.4 | 3.4 | 26.50 | 16.4 | ○ ○ |
| 12 | 2.1 | 1.4 | 0.4 | 1.1 | 1.6 | 1.3 | 15.21 | 13.9 | ○ ○ |

Referring to Table 1, test Nos. 3, 6, and 8 in which the average thickness of the band portions is small although the average thickness of the conductive resin layers 131b and 132b at the connection portions A1 and A2 is large are evaluated to have low flexural strength, confirming that the influence of the average thickness of the conductive resin layers 131b and 132b at the connection portions A1 and A2 on the flexural strength is limited.

In addition, it can be seen that, in the case of Test Nos. 1 to 8 in which the average thickness of the conductive resin layers 131b and 132b at the connection portions A1 and A2 is 13 μm or more, the ESR increases rapidly as the thickness increases.

Meanwhile, it can be seen that Test Nos. 9 to 12 in which the average thickness of the conductive resin layers 131b and 132b at the connection portions A1 and A2 is less than 13 μm have excellent flexural strength characteristics, while the ESR is low.

Meanwhile, the average thickness of the conductive resin layers 131b and 132b at the band portions B1 and B2 need not be particularly limited. However, in order to ensure a sufficient flexural strength characteristics, the average thickness of the conductive resin layers 131b and 132b at the band portions B1 and B2 may be greater than 9.43 μm. More preferably, the average thickness of the conductive resin layers 131b and 132b at the band portions B1 and B2 may be 15.21 μm or more.

Referring to Table 1, it can be seen that Test Nos, 3, 6 and 8 in which the average thickness of the conductive resin layers 131b and 132b at the band portions B1 and B2 is 9.43 μm or less have low flexural strength and Test Nos. 1, 2, 4, 5, 7, and 9 to 12 in which the average thickness of the conductive resin layers 131b and 132b at the band portions B1 and B2 is greater than 9.43 μm have excellent flexural strength.

At the band portions B1 and B2, the conductive resin layers 131b and 132b may be disposed to cover at least a portion of the electrode layers 131a and 132a. In addition, at the band portions B1 and B2, the conductive resin layers 131b and 132b may be disposed to cover the entirety of the electrode layers 131a and 132a. That is, referring to FIG. 4, a length B1b of the band portion of the conductive resin layer may be greater than a length B1a of the band portion of the electrode layer. Accordingly, the flexural strength characteristics may be further improved, and moisture resistance reliability may be improved by covering the ends of the band portions of the electrode layers 131a and 132a to block a moisture penetration path.

The external electrodes 131 and 132 may include plating layers 131c and 132c disposed on the conductive resin layers 131b and 132b.

The plating layers 131c and 132c may be plating layers including at least one of nickel (Ni), tin (Sn), palladium (Pd), and alloys thereof and may be formed of a plurality of layers.

For a more specific example of the plating layers 131c and 132c, the plating layers 131c and 132c may be Ni plating layers or Sn plating layers, may include the Ni plating layer and the Sn plating layer which are sequentially formed, or may include the Sn plating layer, the Ni plating layer, and the Sn plating layer which are sequentially formed. In addition, the plating layers 131c and 132c may include a plurality of Ni plating layers and/or a plurality of Sn plating layers.

Meanwhile, referring to FIG. 8, in an exemplary embodiment in the present disclosure, external electrodes 131' and 132' include connection portions A1 and A2, respectively, disposed on the third and fourth surfaces of the body 110, respectively, and band portions B1 and B2 extending from the connection portions A1 and A2, respectively, and disposed on the first and second surfaces, respectively. Electrode layers 131a' and 132a' may be disposed on the connection portions A1 and A2, respectively, and the band portions B1 and B2, respectively, and conductive resin layers 131b' and 132b' may be disposed on the electrode layers 131a' and 132a' of the band portions B1 and B2, respectively.

According to an exemplary embodiment in the present disclosure, at the band portions B1 and B2 that significantly affect the flexural strength characteristics, the conductive resin layers 131b' and 132b' are disposed on the electrode layers 131a' and 132a', and at the connection portions A1 and A2 that significantly affect ESR, the conductive resin layers 131b' and 132b' may not be disposed on the electrode layers 131a' and 132a', respectively, or may be disposed only at a partial region thereof, thereby lowering the ESR, while the flexural strength characteristics is ensured.

Here, the conductive resin layers 131b' and 132b' may be disposed on the electrode layers 131a' and 132a' of the band portions B1 and B2, so that the conductive resin layers 131b' and 132b' may extend onto at least a portion of the electrode layers 131a' and 132a' of the connection portions A1 and A2.

If the electrode layers 131a' and 132a' include conductive metal and glass, the electrode layers 131a' and 132a' may be formed to have a small thickness at a region in which the connection portions A1 and A2 and the band portions B1 and B2 meet. In this case, the region in which the connection portions A1 and A2 and the band portions B1 and B2 meet may be a main moisture penetration path to degrade moisture resistance reliability.

According to an exemplary embodiment in the present disclosure, since the conductive resin layers 131b' and 132b' are disposed to extend from the band portions B1 and B2 to a part of the connection portions A1 and A2, a path through which moisture penetrates to the region in which A1 and A2 and the band portions B1 and B2 meet may be blocked to thereby improve moisture resistance reliability.

However, the present disclosure is not limited thereto, and the conductive resin layers 131b' and 132b' may not be disposed on the electrode layers 131a' and 132a' of the connection portions A1 and A2.

Here, the external electrodes 131' and 132' include plating layers 131c' and 132c', respectively, and at least a portion of the plating layers 131c' and 132c' may be in direct contact with the electrode layers 131a' and 132a' at the connection portions A1 and A2, respectively, and the plating layers 131c' and 132c' may be in direct contact with the conductive resin layers 131b' and 132b' at the band portions B1 and B2, respectively.

Referring to FIG. 8, since the conductive resin layers 131b' and 132b' are not disposed at a partial region of the connection portions A1 and A2, respectively, the plating layers 131c' and 132c' and the electrode layers 131a' may be in direct contact with each other at the connection portions 131c' and 132c'.

Figure 9:
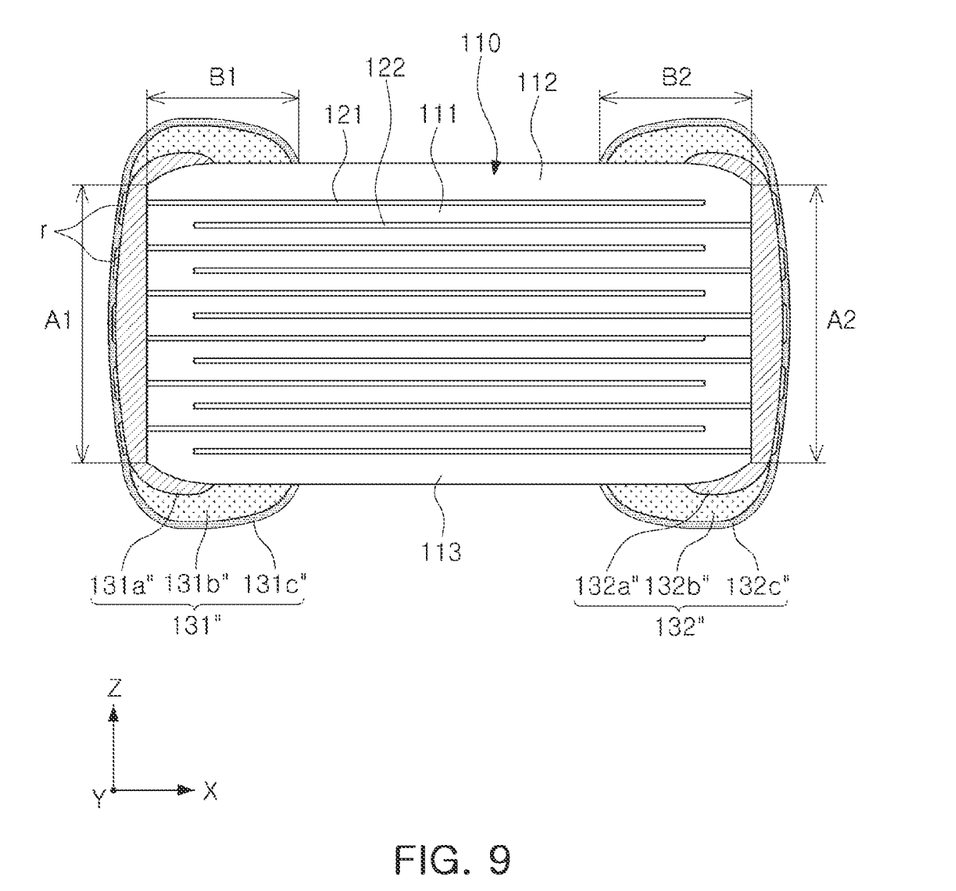
FIG. 9 is a cross-sectional view of a multilayer electronic component according to another exemplary embodiment in the present disclosure corresponding to FIG. 2.

Meanwhile, it may be difficult to completely remove the paste for the conductive resin layer applied to the connection portions A1 and A2. Thus, according to another exemplary embodiment in the present disclosure, the conductive resin layers 131b" and 132b" may be discontinuously disposed at the connection portions A1 and A2 of the external electrodes 131" and 132".

Referring to FIG. 9, the residual paste for the conductive resin layers of the connection portions A1 and A2 may be cured so that the conductive resin layers 131b" and 132b" may be arranged as a plurality of islands r at the connection portions A1 and A2.

Accordingly, a region in which the electrode layers 131a" and 132a" and the plating layers 131c" and 132c" are in contact with each other may also be discontinuous at the connection portions A1 and A2.

As set forth above, according to an exemplary embodiment, the flexural strength characteristics may be improved as the conductive resin layer includes both the epoxy resin and the acrylic resin.

In addition, according to an exemplary embodiment, the ESR may be lowered by reducing the average thickness of the conductive resin layer at the connection portion compared to that at the band portion.

However, the various and beneficial advantages and effects of the present disclosure are not limited to the aforementioned contents and may be more easily understood in the course of describing specific exemplary embodiments of the present disclosure.

While example exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including first and second surfaces opposing each other in a first direction, third and fourth surfaces connected to the first and second surfaces and opposing each other in a second direction, and fifth and sixth surfaces connected to the first to fourth surfaces and opposing each other in a third direction and including a dielectric layer and internal electrodes alternately disposed with the dielectric layer interposed therebetween in the first direction; and
external electrodes disposed on the third and fourth surfaces,
wherein the external electrodes include an electrode layer disposed on the body and a conductive resin layer disposed on the electrode layer,
the conductive resin layer is a single layer including a conductive metal, an epoxy resin, and an acrylic resin, and
the external electrodes include connection portions disposed on the third surface and the fourth surface and band portions extending from the connection portions to the first and second surfaces.

2. The multilayer electronic component of claim 1, wherein an average thickness of the conductive resin layer at the connection portion is smaller than an average thickness of the conductive resin layer at the band portion.

3. The multilayer electronic component of claim 2, wherein an average thickness of the conductive resin layer at the connection portion is less than 13 μm.

4. The multilayer electronic component of claim 3, wherein an average thickness of the conductive resin layer at the connection portion is 7.4 μm or less.

5. The multilayer electronic component of claim 4, wherein an average thickness of the conductive resin layer at the band portion exceeds 9.43 μm.

6. The multilayer electronic component of claim 2, wherein an average thickness of the conductive resin layer at the band portion exceeds 9.43 μm.

7. The multilayer electronic component of claim 6, wherein an average thickness of the conductive resin layer at the connection portion is less than 13 μm.

8. The multilayer electronic component of claim 2, wherein the conductive resin layer is disposed to cover at least a portion of the electrode layer at the band portion.

9. The multilayer electronic component of claim 8, wherein the conductive resin layer is disposed to cover the entirety of the electrode layer.

10. The multilayer electronic component of claim 2, wherein the external electrode includes a plating layer disposed on the conductive resin layer.

11. The multilayer electronic component of claim 1, wherein the external electrodes include connection portions disposed on the third and fourth surfaces and band portions extending from the connection portions to the first and second surfaces, the electrode layer is disposed at the connection portion and the band portion, and the conductive resin layer is disposed on the electrode layer of the band portion.

12. The multilayer electronic component of claim 11, wherein the conductive resin layer extends to at least a portion of the electrode layer of the connection portion.

13. The multilayer electronic component of claim 11, wherein the conductive resin layer is not disposed on the electrode layer of the connection portion.

14. The multilayer electronic component of claim 11, wherein the external electrode includes a plating layer, at least a portion of the plating layer is in direct contact with the electrode layer at the connection portion, and the plating layer is in direct contact with the conductive resin layer at the band portion.

15. The multilayer electronic component of claim 11, wherein the conductive resin layer is discontinuously disposed on the electrode layer at the connection portion.

16. The multilayer electronic component of claim 1, wherein the electrode layer includes a conductive metal and glass.

17. A multilayer electronic component comprising:
a body including first and second surfaces opposing each other in a first direction, third and fourth surfaces connected to the first and second surfaces and opposing each other in a second direction, and fifth and sixth surfaces connected to the first to fourth surfaces and opposing each other in a third direction and including a dielectric layer and internal electrodes alternately disposed with the dielectric layer interposed therebetween in the first direction; and external electrodes disposed on the third and fourth surfaces, wherein the external electrodes include an electrode layer disposed on the body and a conductive resin layer disposed on the electrode layer, the external electrodes include connection portions disposed on the third surface and the fourth surface and band portions extending from the connection portions to the first and second surfaces, the conductive resin layer is a single layer being direct contact with the electrode layers and includes a conductive metal, and an epoxy resin, an average thickness of the conductive resin layer at the connection portion is less than 13 µm, an average thickness of the conductive resin layer at the band portion exceeds 9.43 µm, and the conductive metal includes spherical powder particle or a flake powder particle.

18. The multilayer electronic component of claim 17, wherein an average thickness of the conductive resin layer at the connection portion is smaller than an average thickness of the conductive resin layer at the band portion.

19. The multilayer electronic component of claim 17, wherein an average thickness of the conductive resin layer at the connection portion is 7.4 µm or less.

20. The multilayer electronic component of claim 17, wherein an average thickness of the conductive resin layer at the band portion is 15.21 µm or more.

21. The multilayer electronic component of claim 18, wherein the conductive resin layer is disposed on the electrode layer of the band portion and extends to at least a portion of the electrode layer of the connection portion.

22. The multilayer electronic component of claim 18, wherein the external electrode includes a plating layer disposed on the conductive resin layer.

23. The multilayer electronic component of claim 17, wherein the electrode layer is disposed at the connection portion and the band portion, and the conductive resin layer is disposed on the electrode layer of the band portion.

24. The multilayer electronic component of claim 17, wherein the external electrode includes a plating layer, at least a portion of the plating layer is in direct contact with the electrode layer at the connection portion, and the plating layer is in direct contact with the conductive resin layer at the band portion.

25. The multilayer electronic component of claim 17, wherein the electrode layer includes a conductive metal and glass.

* * * * *